(12) United States Patent
Kruempelmann et al.

(10) Patent No.: US 11,334,370 B2
(45) Date of Patent: May 17, 2022

(54) AUTOMATED SOFTWARE SETUP

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

(*) Notice: Subject to any disclaimer, the term of this patent is extended or adjusted under 35 U.S.C. 154(b) by 128 days.

(21) Appl. No.: 16/538,599

(22) Filed: Aug. 12, 2019

(65) Prior Publication Data

US 2021/0049022 A1 Feb. 18, 2021

(51) Int. Cl.
  *G06F 3/0481* (2022.01)
  *G06F 3/0482* (2013.01)
  *G06F 9/445* (2018.01)
  *G06F 9/451* (2018.01)

(52) U.S. Cl.
  CPC .......... *G06F 9/44505* (2013.01); *G06F 9/451* (2018.02)

(58) Field of Classification Search
  CPC .... G06F 9/44505; G06F 9/451; G06F 3/0481; G06F 3/0482; G06F 3/04842; G05B 2219/50123
  See application file for complete search history.

(56) References Cited

U.S. PATENT DOCUMENTS

| | | | | |
|---|---|---|---|---|
| 7,617,141 B2* | 11/2009 | Chiappetta | ........... | G06Q 20/102 700/99 |
| 2006/0253848 A1* | 11/2006 | Mathieu | ..................... | G06F 8/61 717/168 |
| 2012/0311309 A1* | 12/2012 | Fillipi | ................. | G06F 11/3664 713/1 |
| 2014/0196002 A1* | 7/2014 | Shefer | ....................... | G06F 8/10 717/104 |
| 2014/0279682 A1* | 9/2014 | Feldman | .............. | G06Q 40/025 705/36 R |
| 2016/0077893 A1* | 3/2016 | Laredo | ...................... | G06F 8/36 719/328 |
| 2016/0125042 A1* | 5/2016 | Laredo | ................ | G06F 16/2455 707/723 |
| 2016/0295390 A1* | 10/2016 | Gonzalez De Langarica | ............. | H04M 1/2757 |
| 2017/0286388 A1* | 10/2017 | Tamilarasan | .......... | G06F 16/248 |
| 2020/0153863 A1* | 5/2020 | Wiener | ................... | H04W 4/60 |

* cited by examiner

*Primary Examiner* — Chat C Do
*Assistant Examiner* — Noor Alkhateeb
(74) *Attorney, Agent, or Firm* — Fountainhead Law Group P.C.

(57) ABSTRACT

The present disclosure pertains to automated software setup. In one embodiment, a first set of entity descriptors associated with a first entity is obtained. Similar entities to the first entity are determined by comparing the first set of entity descriptors to each of a plurality of sets of entity descriptors, each associated with a particular entity that previously setup the software. The percentage of the similar entities that selected a particular software functionality requirement is determined and a set of software functionality requirements for the first entity is determined based on the percentages. A user interface is provided for selecting the plurality of possible software functionality requirements and the first set of software functionality requirements are pre-selected in the user interface. Accordingly, software setup for a new entity is automated based on the software setup selections of similar entities.

16 Claims, 8 Drawing Sheets

|  | Industry Area | Industry Detail | Country | Processes | Software Packages |
|---|---|---|---|---|---|
| Industry Area |  |  |  |  |  |
| Industry Detail |  |  |  |  |  |
| Country |  |  |  |  |  |
| Processes |  |  |  |  |  |
| ERP Processes |  |  |  |  |  |

620

|  | ... | Pharmaceutical Industry | Food Industry | Automotive Industry | Heavy Industry | ... |
|---|---|---|---|---|---|---|
| ... | ... | ... | ... | ... | ... | ... |
| Pharmaceutical Industry | ... | 100% | 95% | 5% | 3% | ... |
| Food Industry | ... | 95% | 100% | 4% | 3% | ... |
| Automotive Industry | ... | 5% | 4% | 100% | 90% | ... |
| Heavy Industry | ... | 3% | 3% | 90% | 100% | ... |
| ... | ... | ... | ... | ... | ... | ... |

*FIG. 6*

AUTOMATED SOFTWARE SETUP

BACKGROUND

The present disclosure relates to computing and data processing and in particular to computer software setup.

Computer software system complexity has grown tremendously to the meet expanded software functionality requirements of large entities. This growth in complexity has resulted in a corresponding increase in the complexity and length of software setup processes. Setup of complex software may involve an initial "scoping" process to custom tailor and pare the software system according to the requirements of the entity using it. Scoping generally involves one or more users or administrators of the software system selecting certain high-level functions and processes to be implemented by the software system along with selecting numerous detailed software functionality requirements. The various software functionality requirements can be used to generate configuration settings and files for use in execution of the software.

Proper selection of the software functionality requirements to meet the scope and requirements of an entity may require several subject matter experts to spend hours or even days considering and reviewing dozens or even hundreds of questions or statements regarding their requirements. If the software requirements selected during scoping are underinclusive, then the entity will not be able carry out their processes. On the other hand, if the software requirements are overinclusive, then the configured software may be overly large, thereby wasting computing and storage resources while also complicating the user interface and hindering user productivity. For complex software, selection of the various software functionality requirements during software setup may be onerous, time consuming, and error prone.

SUMMARY

The present disclosure provides automated software setup techniques for improving the software setup process. One embodiment provides a computer-implemented method for software setup. The method includes obtaining a first set of entity descriptors associated with a first entity. The method further includes determining one or more similar entities. The similar entities may be determined by comparing the first set of entity descriptors to each of a plurality of sets of entity descriptors. Each set of entity descriptors may be associated with a particular entity. The method further includes obtaining sets of selected software functionality requirements associated with each of the one or more similar entities. The method further includes determining a percentage of the one or more similar entities that selected each of a plurality of possible software functionality requirements. The percentages may be determined using the set of selected software functionality requirements associated with each of the one or more similar entities. The method further includes determining a first set of software functionality requirements for the first entity. The first set of software functionality requirement may be determined based on the percentages of the one or more similar entities that selected each of the plurality of possible software functionality requirements. The method further includes providing a user interface for selecting the plurality of possible software functionality requirements for the first entity. The first set of software functionality requirements may be pre-selected in the user interface.

Another embodiment provides a non-transitory machine-readable medium storing a program. The program may be executable by at least one processing unit of a device. The program comprises sets of instructions for obtaining a first set of entity descriptors associated with a first entity. The program includes further instructions for determining one or more similar entities by comparing the first set of entity descriptors to each of a plurality of sets of entity descriptors. Each set of entity descriptors may be associated with a particular entity. The program includes further instructions for obtaining sets of selected software functionality requirements associated with each of the one or more similar entities. The program includes further instructions for determining a percentage of the one or more similar entities that selected each of a plurality of possible software functionality requirements. The percentages may be determined using the sets of selected software functionality requirements associated with each of the one or more similar entities. The program includes further instructions for determining a first set of software functionality requirements for the first entity based on the percentages of the one or more similar entities that selected each of the plurality of possible software functionality requirements. The program includes further instructions for providing a user interface for selecting the plurality of possible software functionality requirements for the first entity. The first set of software functionality requirements may be pre-selected in the user interface.

Another embodiment provides a computer system comprising one or more processors, memory, and computer program code comprising instructions. The instructions may be executable on said one or more processors. The computer program code may be configured to obtain a first set of entity descriptors associated with a first entity. The computer program code may be further configured to determine one or more similar entities by comparing the first set of entity descriptors to each of a plurality of sets of entity descriptors. Each set of entity descriptors may be associated with a particular entity. The computer program code may be further configured to obtain sets of selected software functionality requirements associated with each of the one or more similar entities. The computer program code may be further configured to determine a percentage of the one or more similar entities that selected each of a plurality of possible software functionality requirements. The percentages may be determined using the sets of selected software functionality requirements associated with each of the one or more similar entities. The computer program code may be further configured to determine a first set of software functionality requirements for the first entity based on the percentages of the one or more similar entities that selected each of the plurality of possible software functionality requirements. The computer program code may be further configured to provide a user interface for selecting the plurality of possible software functionality requirements for the first entity. The first set of software functionality requirements may be pre-selected in the user interface.

The following detailed description and accompanying drawings provide a better understanding of the nature and advantages of the present disclosure.

BRIEF DESCRIPTION OF THE DRAWINGS

FIG. 3 illustrates additional exemplary user interfaces 310, 320 for automated software setup according to an embodiment.

FIG. 6 illustrates exemplary data tables 610, 620 according to an embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
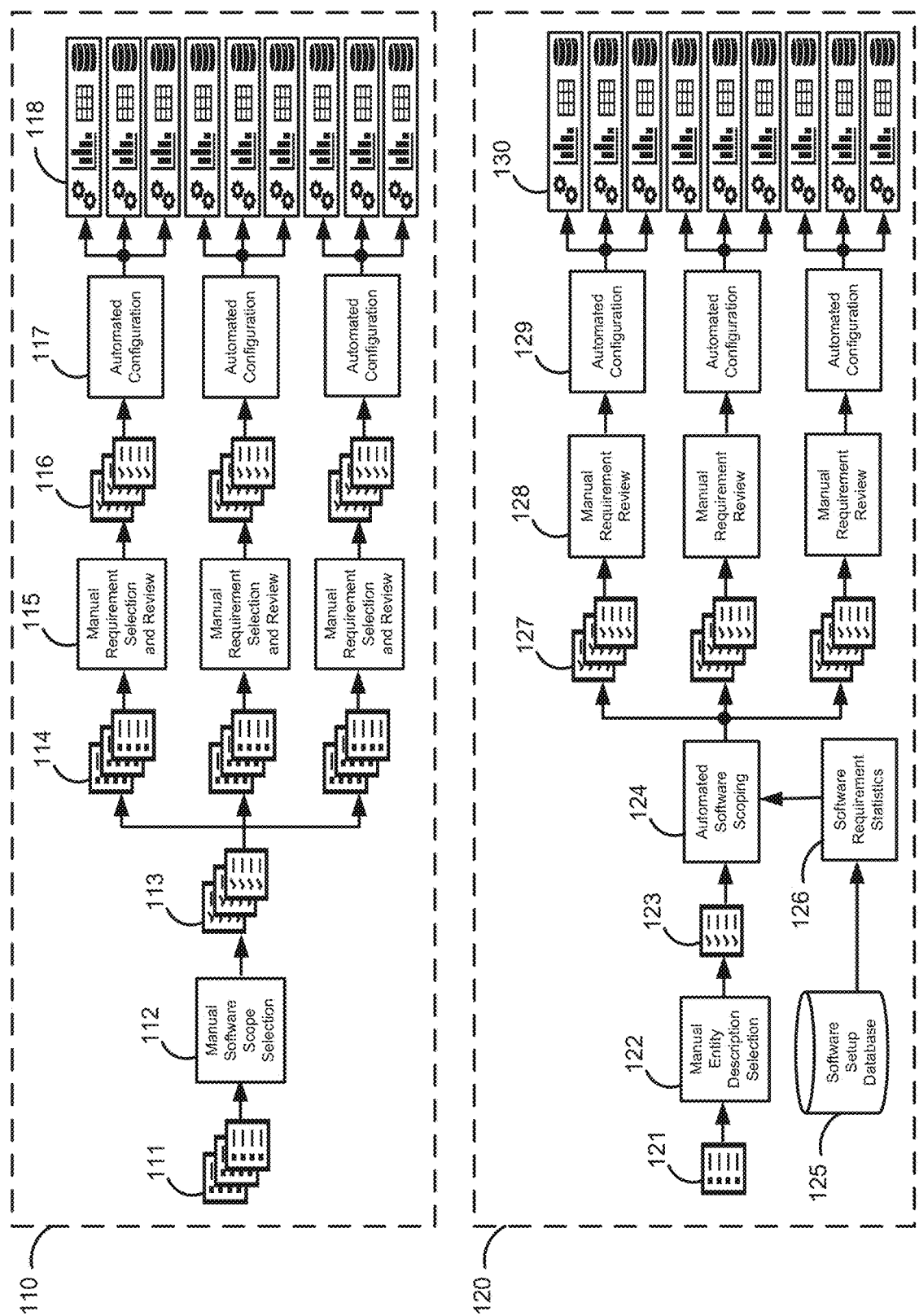
FIG. 1 illustrates an overview of an exemplary manual software setup process 110 and an exemplary automated software setup process 120 according to an embodiment.

As discussed here, setup of complex software systems may be onerous, time consuming, and error prone. FIG. 1 illustrates an overview of an exemplary manual software setup process 110 and an exemplary automated software setup process 120 according to an embodiment. The manual software setup process 110 is referred to as a "manual" process because a person (e.g., a setup user of an entity) may perform manual software scope selection 112 and manual requirement selection and review 115. However, at least a portion of the manual software setup process 110 may be automated. For example, the manual software setup process 110 includes automated configuration 117 of the software settings based on the selected requirements. Thus, the setup user may not be required to manually configure specific database tables and properties and they may not be required to manually generate file structures and permissions even though the manual software setup process 110 is referred to as a "manual" process.

The manual software setup process 110 may involve the setup user setting up the software for use by an entity. In some embodiments, the software may be installed to remote computers in a cloud computing configuration. In other embodiments, the software may be installed to a local computer. The entity may include one or more users that will use the software. An entity may refer to people or organizations. For entities that pertain to people, the entity may refer to a person or to a group of people, for example. For entities that pertain to organizations, the entity may refer to an organization or institution, for example. In some embodiments, the entity may be a university, a government organization, a medical group, or an enterprise.

Some software setup processes may include a list of high-level scoping elements 111. A high-level scoping element 111 can define a group or set of scoping elements. For example, a high-level scoping element could pertain to "Accounts" and include several scoping elements pertaining to accounts. For example, scoping elements pertaining to the "Accounts" high-level scoping element could include a scoping element for "Account Creation" and a scoping element for "Account Permission." For example, these scoping elements may be used to set functionality requirements corresponding to account creation and account permissions, respectively.

The manual software setup process 110 may involve the setup user performing manual software scope selection 112, which includes selecting elements from a list of high-level scoping elements 111. The high-level scoping elements 111 may broadly define areas within which the entity performs processes that will be performed in conjunction with the software. In one example, the software being setup is enterprise resource planning (ERP) software and the high-level scoping elements 111 may include an "administration" scoping element, a "compliance" scoping element, and an "service" scoping element, among many other high-level scoping elements 111. The high-level scoping elements 111 may be different for different types of software. Depending on the complexity and scope of the software, there may be dozens of high-level scoping elements 111, for example. In less complex software, there may be fewer high-level scoping elements 111. As the high-level scoping elements 111 may be provided for organization and ease-of-use, some software setup processes may not include a separate high-level scoping elements 111.

After the setup user has performed the manual software scope selection 112 of the high-level scoping elements 111, the selected scoping elements 113 may be expanded into numerous possible software functionality requirements 114 by the software setup process. That is, each of the selected scoping elements 113 may be associated with a set of possible software functionality requirements 114. There may be greater or fewer possible software functionality requirements 114 depending on the complexity of the processes associated with the corresponding high-level scoping element.

In one example of a software setup process for enterprise resource planning software, a high-level scoping element 111 could be associated with "Activity Management" processes and a set of possible software functionality requirements 114 may include a requirement to maintain activity planners in the software system, another requirement to maintain surveys in the software system, a requirement to record information from activity lists in the software system, and a requirement to use e-mail addresses instead of names in the software system, for example.

In some embodiments, the possible software functionality requirements 114 may be phrased as questions or as statements, for example. The possible software functionality requirements 114 may be referred to as scoping questions. Each of the possible software functionality requirements 114 may be selected, or not selected, by the setup user. To perform setup of the software, the setup user may perform manual requirement selection and review 115 of each of the possible software functionality requirements 114 for each of the selected scoping elements 113. In some situations, this can involve manual review of hundreds of possible software functionality requirements 114. In some cases, the selection of a particular software functionality requirements 114 may further include inputting a value (e.g., a number or alphanumeric phrase).

After the setup user performs manual requirement selection and review 115, the selected software functionality requirements 116 may be obtained by the software setup process for use in automated configuration 117 of the software. Automated configuration 117 may involve activating or configuring various software configuration settings 118. For example, the software configuration settings 118 may control the appearance of the software (e.g., the user interface layout and inclusion or exclusion of certain functions), the initial settings of charts and tables presented in the software, and the storage settings and locations used by the software. The software configuration settings 118 may control or configure any aspect of the software. In some embodiments, each different set of selected software functionality requirements 116 may correspond to a different software configuration setting 118.

One example of a manual software setup process 110 for a certain software system involves the setup user manually reviewing and selecting from among thirty high-level scoping elements, where each high-level scoping element is associated with twenty to one hundred different possible software functionality requirements 114, where each different set of possible software functionality requirements 114, when selected, leads to a different configuration of the software, resulting in thousands or even millions of different configurations depending on the number of possible software functionality requirements 114. Given the high complexity, the manual software setup process 110 may be onerous, time consuming, and error prone.

The automated software setup process 120 improves upon the manual software setup process 110 by vastly reducing the number and complexity of the selections that need to be made and reviewed by the setup user. In order to reduce the effort to setup the software, the automated software setup process 120 uses the software functionality requirements of other entities in a statistical process to proposes software functionality requirements to similar entities setting up the software, as it is likely the similar entities will have similar software functionality requirements. For example, companies in a specific industry are likely to have similar software functionality requirements when setting up enterprise resource planning software. In a specific example, most pharmaceutical companies may set batch processing as a software functionality requirement for a manufacturing management process during setup of enterprise resource planning software, as batch processing may be required by laws and regulations.

The automated software setup process 120 may be referred to as an "automated" process because it involves automated software scoping 124 performed by the computer system executing the setup (e.g., installation) software instead of the manual software scope selection 112 and the manual requirement selection and review 115 performed by the setup user in the manual software setup process 110.

The automated software setup process 120 may involve the setup user performing manual entity description selection 122, which includes selecting or setting a set of possible entity descriptors 121 that describe the entity and the processes of the entity. For example, if the software being setup is enterprise resource planning software, the entity descriptors may include one or more of an industry area descriptor (e.g., automotive industry, food industry, pharmaceutical industry, etc.), an industry detail descriptor (e.g., automobile manufacturer, automotive parts supplier, tire manufacturer, reseller, etc.), a country descriptor (e.g., Germany, the United States, etc.), one or more process descriptors (e.g., international financial reporting standards general ledger model, U.S. generally accepted accounting principles general ledger model, batch processing, serial processing, naming conventions, legal requirements and regulations, etc.), or one or more descriptors of software products or packages used by the entity (e.g., inventory management software, relationship management software, etc.). In some embodiments, the automated software setup process 120 may recommend processes or software packages to an entity during the software setup process if other similar entities used those processes or software packages.

While a manual software setup process 110 may involve selecting entity descriptors as part of scope selection 112 or requirement selection 115, use of such entity descriptors in the manual software setup process 110 may not involve comparison to entity descriptors associated with other entities (e.g., entities that previously setup the software). A manual software setup process 110 may also not involve pre-selecting software functionality requirements using software requirement statistics 126 based on entity descriptors and software functionality requirements for other similar entities, as in the automated software setup process 120. For example, while a manual software setup process 110 may involve a new entity indicating that they are located in Germany (a "country" type entity descriptor) and that they are operating in the automotive industry (an "industry area" type entity descriptor), the manual software setup process 110 may not determine other entities located in Germany and operating in the automotive industry (e.g., similar entities) and use the selected software functionality requirements for those entities to pre-select software functionality requirements for the new entity performing software setup.

The entity descriptors 123 may be used in an automated software scoping process 124 that determines which software functionality requirements 127 to select (e.g., pre-select for review) based on the software functionality requirements for other entities (stored in a software setup database 125, for example) according to a software requirement statistics process 126. The automatic selection of software functionality may be possible because entities having the same or similar entity descriptors may have similar software functionality requirements. For example, an automobile manufacturer in Germany may have similar enterprise resource planning software functionality requirements as other automobile manufacturers in Germany. In another example, pharmaceutical manufacturers using batch processing may have similar enterprise resource planning software functionality requirements to food processing enterprises using batch processing.

The software requirements statistics 126 can be presented to the setup user in a user interface for reviewing the software functionality requirements 127 pre-selected by the automated software scoping process 124. For example, the percentage of similar entities that selected a particular software functionality requirement may be presented to the setup user to help them perform their manual requirement review 128 process. The manual requirement review process 128 may involve the setup user selecting other software functionality requirements, changing the software functionality requirements, or removing some of the pre-selected software functionality requirements. In some embodiments, the setup user may not perform manual requirement review 128, relying on the automated software scoping process 124.

After the automated software scoping 124 and any manual requirement review 128, the selected software functionality requirements 127 may be obtained by the software setup process for use in automated configuration 129 of the software. Automated configuration 129 may involve activating or configuring various software configuration settings 130. For example, the software configuration settings 130 may control the appearance of the software (e.g., the user interface layout and inclusion or exclusion of certain functions), the initial settings of charts and tables presented in the software, and the storage settings and locations used by the software. The software configuration settings 130 may control or configure any aspect of the software. In some embodiments, each different set of selected software functionality requirements 127 may correspond to a different software configuration settings 130.

The automated software setup process 120 described herein improves prior manual software setup processes 110. For instance, manual entity description selection 122 of a small number of entity descriptors in the automated software setup process 120 may be less complex and less error prone compared to the manual requirement selection and review 115 of hundreds, for example, of software functionality requirements in the manual software setup process 110. As such, the automated software setup process 120 can be performed faster (e.g., because the automated process involves far fewer options or requirements being are manually selected and more options or requirements being automatically selected) and the review of the software setup can be performed faster by using statistics of other similar entities for comparison.

As discussed above, entity descriptors can be set or selected during the automated software setup process. These entity descriptors can be set using a user interface of the software setup process.

Figure 2:
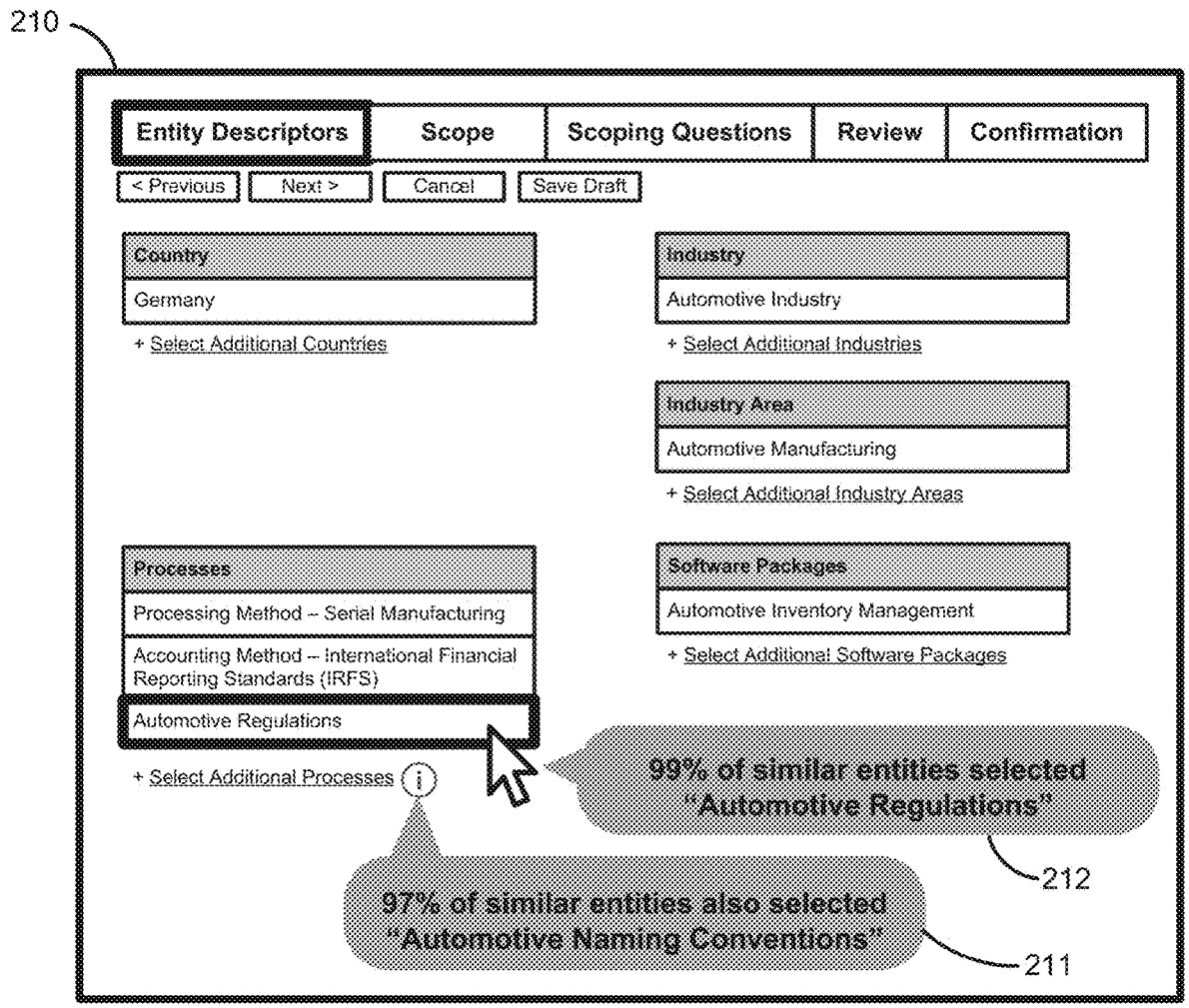
FIG. 2 illustrates an exemplary user interface 210 for automated software setup according to an embodiment.

FIG. 2 illustrates an exemplary user interface 210 for automated software setup according to an embodiment. The user interface 210 may be presented to a setup user during an automated software setup process for enterprise resource planning software, for example. In this example, a setup user has selected entity descriptors for the entity indicating that the entity is located in the country of Germany and they are operating in the automotive industry, in automotive manufacturing in particular, as shown in FIG. 2. The setup user has selected entity descriptors indicating that the entity uses automotive inventory management software packages, serial manufacturing processing methods, international financial reporting standard accounting methods, and processing for complying with automotive regulations. The user interface for selecting entity descriptors may look different in other embodiments. In one embodiment, the user interface for selecting entity descriptions can provide a chat interface with chat bot natural language processing mechanisms where the entity descriptions are selected based on questions presented by the chat bot and the answers given by the user. This embodiment may provide a more convenient user experience.

As mentioned above, the automated software setup process may determine statistics based on the entity descriptors selected by the entity and use them in an automated software scoping process for selecting software functionality requirements. In addition, the automated software setup process may determine statistics based on the entity descriptors selected by the entity for providing recommendations of addition processes and software packages that other similar entities are using. As shown in FIG. 2, the setup user may have selected process entity descriptors indicating serial manufacturing processing methods, international financial reporting standard accounting methods, and processing for complying with automotive regulations. In this example, other similar entities (e.g., automotive manufacturers in Germany or automotive manufacturers generally) may also use an automotive naming convention process. The automated software setup process may determine the processes and software packages implemented by similar entities using statistical techniques comparing the entity descriptors for previously setup entities to the new entity. In some embodiments, the statistical techniques can include a percentage calculation (e.g., the number of fits over the number of points) or a chi-squared method, for example.

As shown in FIG. 2, the recommendation to use an automotive naming convention process can be presented as a notification. The recommendation 211 can include statistical information regarding the similar entities. For example, the recommendation 211 can indicate the percentage of similar entities that are implementing a particular process. In this example, the notification indicates that 97% of similar entities (e.g., automotive manufacturers in Germany or automotive manufacturers generally) implement automotive naming convention processes.

The notification 211 may be presented in the user interface 210 automatically or it may be presented in response to a user interface interaction. For example, another notification 212 may be presented in response to a user interface interaction of selecting a particular entity descriptor (e.g., clicking on or hovering a pointer over a corresponding user interface box). As shown in FIG. 2, a setup user may select "automotive regulations" and the user interface may present the notification 212 indicating that 99% of similar entities (e.g., automotive manufacturers in Germany or automotive manufacturers generally) implement the automotive regulations processes.

As discussed above, the automated software setup process may use the entity descriptors to determine similar entities and pre-select certain software functionality requirements. The software functionality requirements may be pre-selected based on the number or percentage of similar entities that selected those software functionality requirements when they previously performed setup of the software.

The presentation of notifications and statistics in the user interface is advantageous because it may enable the entity to recognize processes that are missing or lacking and implement those processes to improve the overall operation of the entity.

Figure 3:
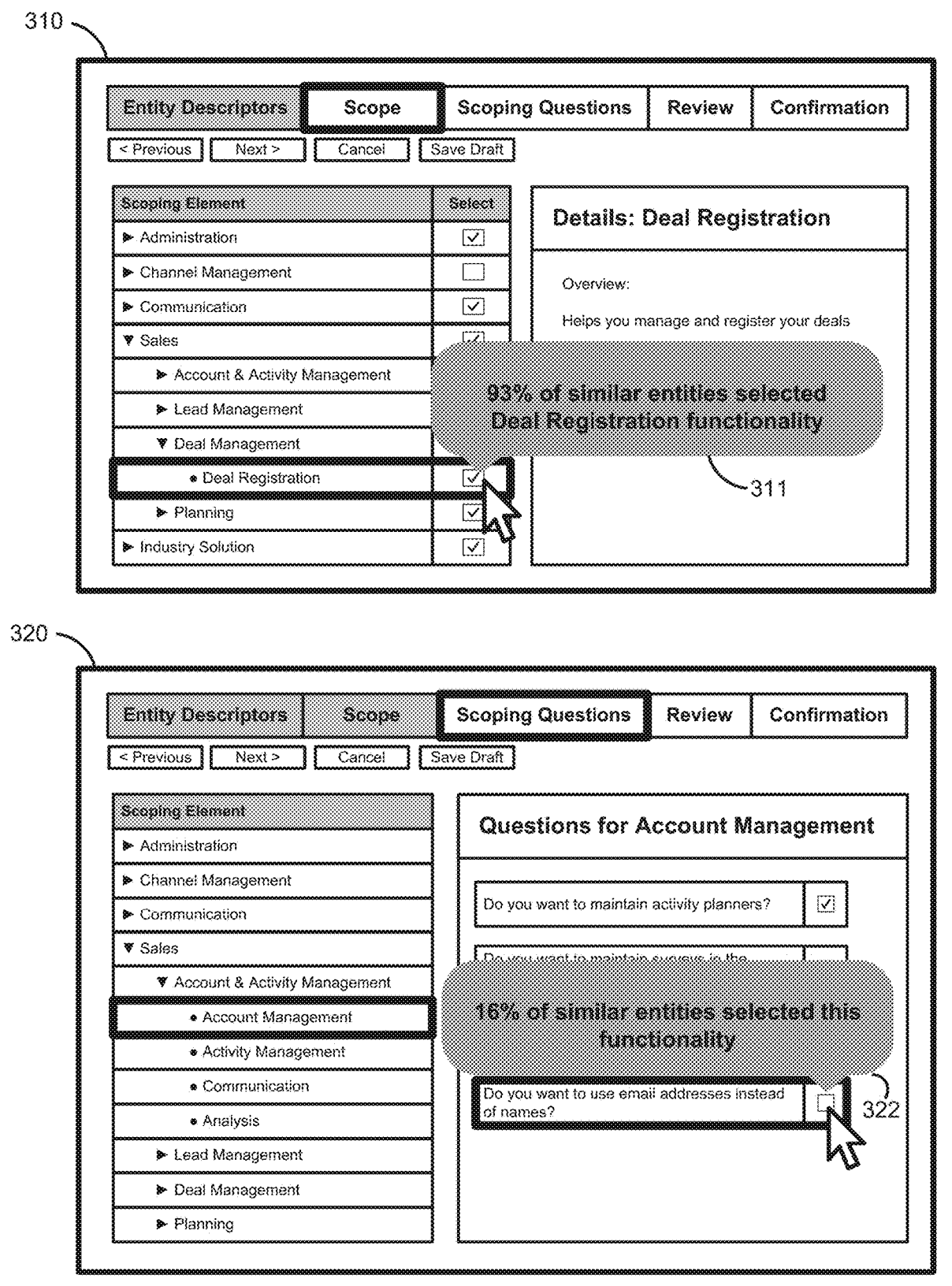

FIG. 3 illustrates additional exemplary user interfaces 310, 320 for automated software setup according to an embodiment. In an example software setup process, the user interface 310 may be used to select high-level scoping elements and the user interface 320 may be used to select particular software functionality requirements. In some embodiments, the automated software setup process may not use separate high-level scoping elements and may not use a user interface similar to the user interface 310.

As shown in FIG. 3, the scoping elements may include a "sales" high-level scoping element including a "deal management" scoping element, which includes a "deal registration" scoping element. The user interface 310 may present a notification 311 when a user selects the "deal registration" scoping element. In this example, the notification may indicate statistics of similar entities. For example, 93% of similar entities may have selected the "deal registration" scoping element.

Such notifications are advantageous because they enable the setup user may review the scoping elements quickly and easily based on the statistical information. For example, given notification 311, the setup user may quickly determine to leave the "deal registration" scoping element selected as many (e.g., 93%) other similar entities select this scoping element.

As shown in FIG. 3, the user interface 320 may be used for selecting software functionality requirements. For example, a user may have selected the "account management" scoping element that is included in the "account and activity management" scoping element that is included in the "sales" scoping element. In this example, a setup user may be considering whether the select the software functionality requirement to "use email addresses instead of names." When the setup user hovers over a check box for that particular software functionality requirement, a notification 322 may be presented indicating statistics regarding that software functionality requirement. In this example, the notification 322 indicates that 16% of similar entities selected that software functionality requirement.

Such notifications are advantageous because they enable the setup user may review the software functionality requirements quickly and easily based on the statistical information. For example, given notification 322, the setup user may quickly determine to not select the "use email addresses instead of names" software functionality requirement as few (e.g., 16%) other similar entities use this functionality. With knowledge of the statistical information, the setup user may be able to pare down and the software installation while still maintaining all required software features and functions. Thus, the software installation and configuration is optimized for the entity and does not allocate computing and storage resources for non-required or unused software functionality. In addition, the user interface can be streamlined for the entity by including features that may be used and not including features that may not be used. Thus, the automated software setup leads to more efficient use of computing resources and a more effective and productive user experience.

Figure 4:
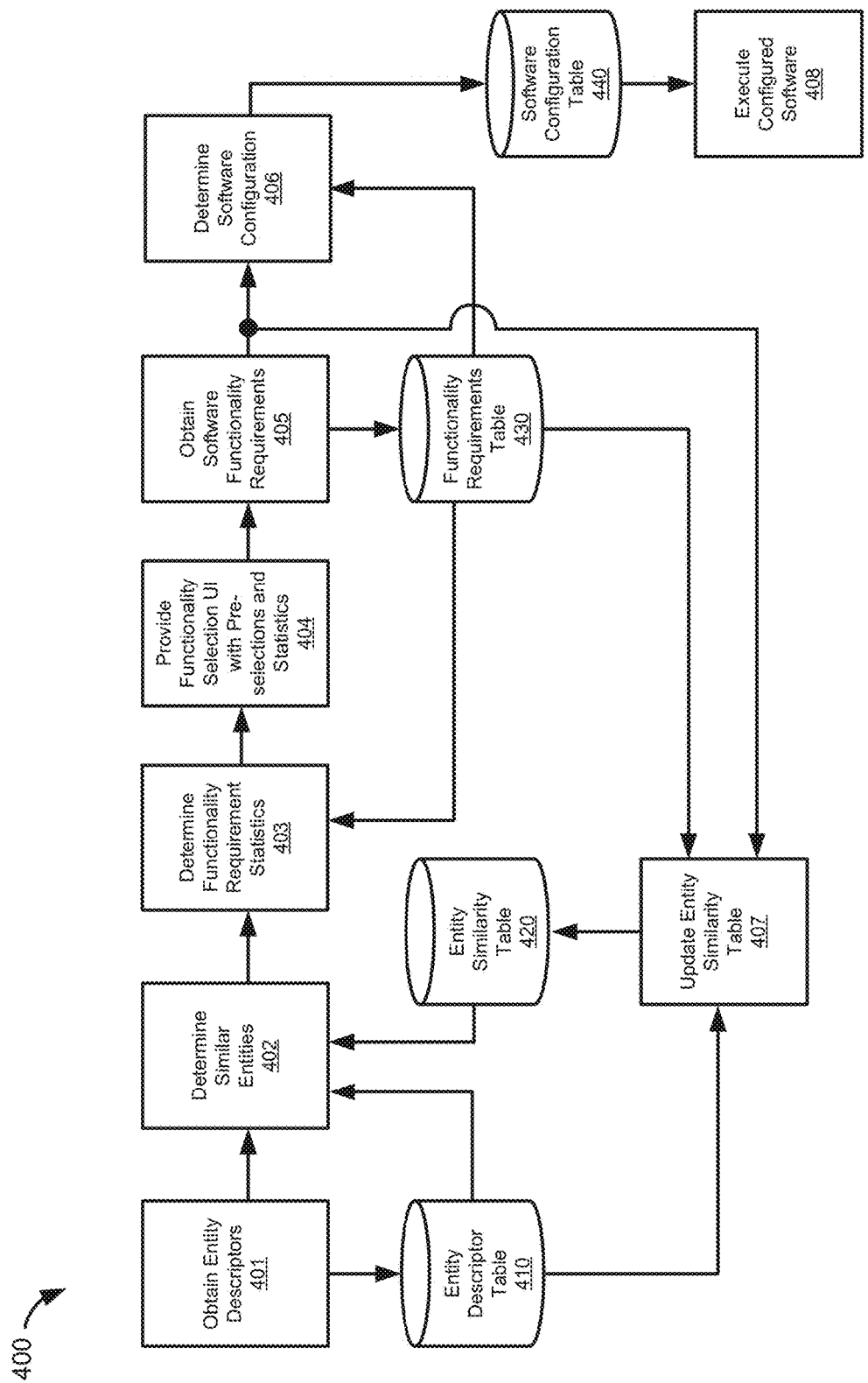
FIG. 4 shows is an information diagram 400 of automated software setup according to an embodiment.

As discussed above, an automated software setup process can determine entities similar to a new entity and use information about their software requirements in setting up the software for the new entity. FIG. 4 shows an information diagram 400 of automated software setup according to an embodiment. The information diagram 400 shows functionality that can be performed by a computer (e.g., a cloud computing system comprising network-connected computer servers and databases).

At 401, the computer system obtains entity descriptors. These entity descriptors can describe a new entity that will be using the software. The entity may be an organization or institution. For example, the entity may be a university, a government organization, a medical group, or an enterprise. In some embodiments, the software can be enterprise resource planning software, and the first set of entity descriptors includes one or more of an industry area (e.g., automotive industry) of the first entity, an industry detail (automotive manufacturing) of the first entity, a country (e.g., Germany) of the first entity, and a set of processes (e.g., serial manufacturing, accounting processing, naming conventions, etc.) of the entity.

The computer system can store the entity descriptors in an entity descriptor table 410. The entity descriptors are stored so that they can be used in identifying entities that are similar to other new entities in performing automated software setup. As described herein, a "table" may refer to a table within a database. However, in some embodiments a different data structure is used instead of a table.

In some embodiments, the entity descriptors for a particular entity may be associated with a unique identifier. The unique identifier may be anonymized without respect to the entity itself, such that the name of the entity cannot be identified from the unique identifier.

At 402, the computer system determines similar entities. The similar entities may be determined by comparing the entity descriptors obtained at 401, and stored in the entity descriptor table 410, to other sets of entity descriptors stored in the entity descriptor table 410. In some cases, the new entity may have a set of entity descriptors that match the entity descriptors for one or more entities in the entity descriptor table 410. In other cases, none of the entities are a match for the new entity (e.g., none of the entities that setup the software have the same set of entity descriptors).

In cases where there are no matching entities, similar entities may be determined using an entity similarity table 420. The entity similarity table may include a similarity value for each tuple of entity descriptors. The similarity value for a first tuple and second tuple of entity descriptors may indicate the degree of similarity between selected software functionality requirements for entities associated with the first tuple of entity descriptors and entities associated with the second tuple of entity descriptors. The similarity can be determined using statistical techniques (e.g., a percentage calculation or a chi-squared method).

For example, if the software is enterprise resource planning software, enterprises in heavy industry may select software functionality requirements that are vastly different from enterprises in the pharmaceutical industry while a part supplier in heavy industry may select software functionality requirements that are very similar to an automotive industry part supplier.

As described herein, the similarity values in the entity similarity table 420 may be determined using statistical processes on the entity descriptors and the software functionality requirements stored for each different entity in the functionality requirements table 430. The similarity values may be updated each time that a new entity performs software setup using the new entity's selected entity descriptors and software functionality requirements.

At 403, the computer system may determine software functionality requirement statistics. The statistics may indicate a percentage of similar entities that selected a particular software functionality requirement for each different possible software functionality requirement offered by the software setup. The computer system can look up the software functionality requirements selected by each of the similar entities in a functionality requirement table 430.

At 404, the computer system can provide a functionality selection user interface for selecting from among the possible software functionality requirements. Each possible software functionality requirement can include statistics on the requirement. For example, the user interface can indicate the percentage of similar entities that selected a particular software functionality requirement, as discussed here. In some embodiments, certain software functionality requirements may be pre-selected in the user interface based on their corresponding percentages being above a threshold. For example, if 80% of similar entities selected a particular software functionality requirement then that particular requirement may be pre-selected in the user interface. In addition, the user interface may provide an indication or notification that 80% of similar entities selected that particular software functionality requirement. Other software functionality requirements that are not as often selected by the similar entities may not be pre-selected in the user interface.

A setup user can review the software functionality requirements, select or deselect the various software functionality requirements, and then confirm the selected software functionality requirements to use in the software configuration. At 405, the computer system obtains the selected software functionality requirements. The software functionality requirements for the new entity may be stored in the functionality requirements table 430 such that they can be used in the setup of later entities. The selected software functionality requirements in the functionality requirements table 430 may be associated with a unique identifier of the entity.

At 406 the computer system can use the entity's selected software functionality requirements to determine a software configuration for the software. The software configuration may involve activating or configuring various software configuration settings according to the entity's requirements. For example, the software configuration settings may control the appearance of the software (e.g., the user interface layout and inclusion or exclusion of certain functions), the initial settings of charts and tables presented in the software, and the storage settings and locations used by the software. The software configuration settings may control or configure any aspect of the software. In some embodiments, each different set of selected software functionality requirements may correspond to a different software configuration setting. The computer system can store the software configuration in a software configuration table 440. In some embodiments, the software configuration may be stored in a different file structure (e.g., an Extensible Markup Language (XML) file or a JavaScript Object Notation (JSON) file). The software configuration settings noted in the software configuration table 440 may be used to execute the software as configured at 408.

In addition, after the computer system obtains the selected software functionality requirements at 405, the computer system may update the entity descriptor table 420 at 407. That is, the current entity is added to the entity similarity table 420 so that it may be checked for similarity against later entities using the automated software setup process. In this way, if the current entity selected software functionality requirements that were different from those pre-selected by the computer system based on the statistics, then those changes can be reflected in later automated software setup processes. This is advantageous because the recommended (e.g., pre-selected) software functionality requirements can change over time to adapt to changes in entity processes.

Figure 5:
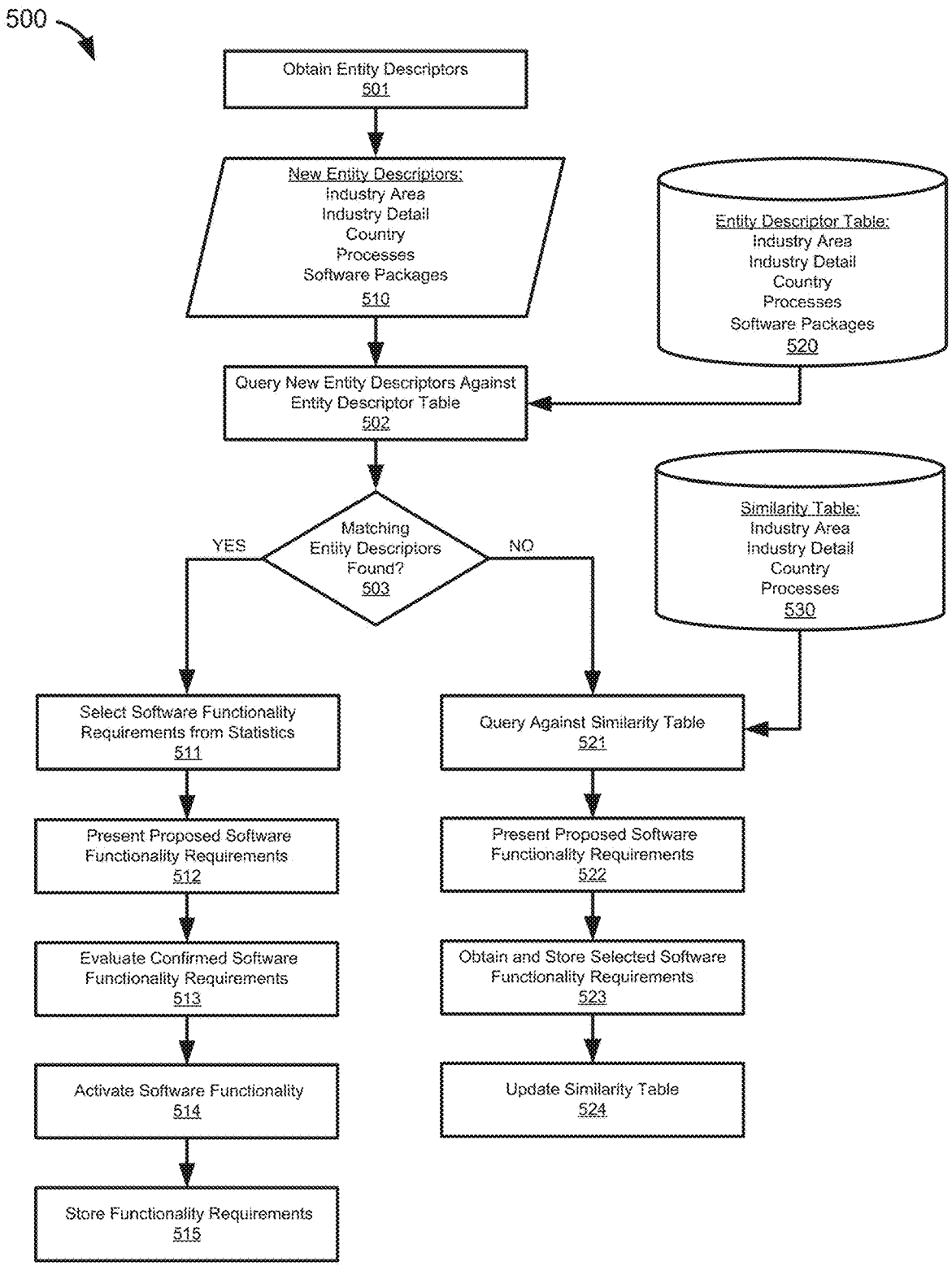
FIG. 5 shows a diagram 500 of an automated software setup process according to an embodiment.

FIG. 5 shows a diagram 500 of an automated software setup process according to an embodiment. The diagram 500 of FIG. 5 is similar to the diagram 400 of FIG. 4 but it further details the processes performed when a matching entity is found compared to when a matching entity is not found. The steps shown in FIG. 5 may be performed by a computer system (e.g., a cloud computing system) as discussed here.

At 501, the computer system may obtain entity descriptors 510 for a new entity. As shown in FIG. 5, the new entity descriptors 510 may include the industry area, the industry detail, the country, the entity's processes, and the software packages used by the entity.

At 502, the computer system can query the new entity descriptors 510 against an entity descriptor table 520. The entity descriptor table may include sets of entity descriptors for other entities that installed the software. The entity descriptor table may include, for each different entity, the industry area, the industry detail, the country, the entity's processes, and the software packages used by the entity.

At 503, the computer system determines whether any entities having entity descriptors stored in the entity descriptor table 520 match the new entity descriptors 510. If one or more entities match the new entity then the decision is YES at 503 and the process continues to 511. If no entities match the new entity then the decision is NO at 503 and the process continues to 521.

At 511, the computer system can select software functionality requirements for the new entity using statistics, as described here. For example, certain software functionality requirements may be pre-selected based on the percentage of similar entities that selected that particular software functionality requirement.

At 512, the computer system can present the proposed software functionality requirements. For example, the proposed (e.g., pre-selected) software functionality requirements can be presented in a user interface, as described herein.

At 513, the computer system can evaluate the confirmed (e.g., selected and reviewed) software functionality requirements to determine whether they are different from the proposed software functionality requirements.

At 514, the computer system can activate the software functionality. That is, the computer system may configure the software settings as described here.

At 515, the confirmed software functionality requirements may be stored in a functionality requirements table as described herein. As such, it can be used to propose software functionality requirements for similar entities initiating the automated software setup later on.

If no entities match the new entity and the decision is NO at 503, then the automated software setup process continues to 521, where the computer system queries the new entity descriptors against a similarity table 530. The similarity table 530 can include the industry area, industry detail, country, and entity processes. The similarity table 530 may indicate the similarity between each different tuple as described herein.

At 522, after identifying similar entities based on the similarity table 530, the computer system may present proposed software functionality requirements.

At 523, the computer system may obtain and store the selected software functionality requirements. The selected software functionality requirements may be stored in a functionality requirements table, as described herein for example.

At 524 the computer system may update the similarity table 530 based on the selected software functionality requirements for the new entity.

Thus, the computer system can propose software functionality requirements to new and different entities (e.g., entities having different sets of entity descriptors) according to their similarity to previous entities. This is advantageous because the automated software setup process can be implemented without requiring information on the software functionality requirements for each specific variation of entities.

As discussed above, an entity similarity table may be used to determine one or more entities that are similar to a new entity performing software setup. FIG. 6 illustrates exemplary data tables 610, 620 according to an embodiment. The data table 610 shows the data fields that may be included in an exemplary similarity table. Details of the data that may be included in the table cells are shown in table 620. The data fields in table 610 may be based on the types of entity descriptors that may be selected in the automated software setup process. For example, if the software is enterprise resource planning software, then the data fields in the similarity table can include the industry area, the industry detail, the county, the set of processes, and the set of software packages used by the entity. The data fields of the similarity table 610 may be different when used in the setup of different types of software.

The similarity table may indicate the similarity between each different combination of the different entity descriptors. For example, the data table 620 shows a subset of a similarity table that may be used in the automated software setup processes described here. The ellipsis shown in table 620 indicate that there are other rows and columns in the table. However, a subset of rows and columns are shown in FIG. 6 for clarity.

In this example, the similarity table 620 indicates that the pharmaceutical industry is 95% similar to the food industry. The term similarity here refers to the similarity of the software functionality requirements selected by entities in that industry. The similarity table 620 also indicates that the automotive industry is 90% similar to heavy industry. These similarity values may be determined using statistical processes on the entity descriptors and the software functionality requirements stored for each different entity. The similarity values may be updated each time that a new entity performs software setup using the new entity's selected entity descriptors and software functionality requirements.

The similarity table is advantageous because it can be used to determine entities that are similar to a new entity even when the new entity has entity descriptors that do not match any entity that previously setup the software. Accordingly, software functionality requirement selection may be automated for a new entity using the software functionality requirements selected by similar but different entities.

Figure 7:
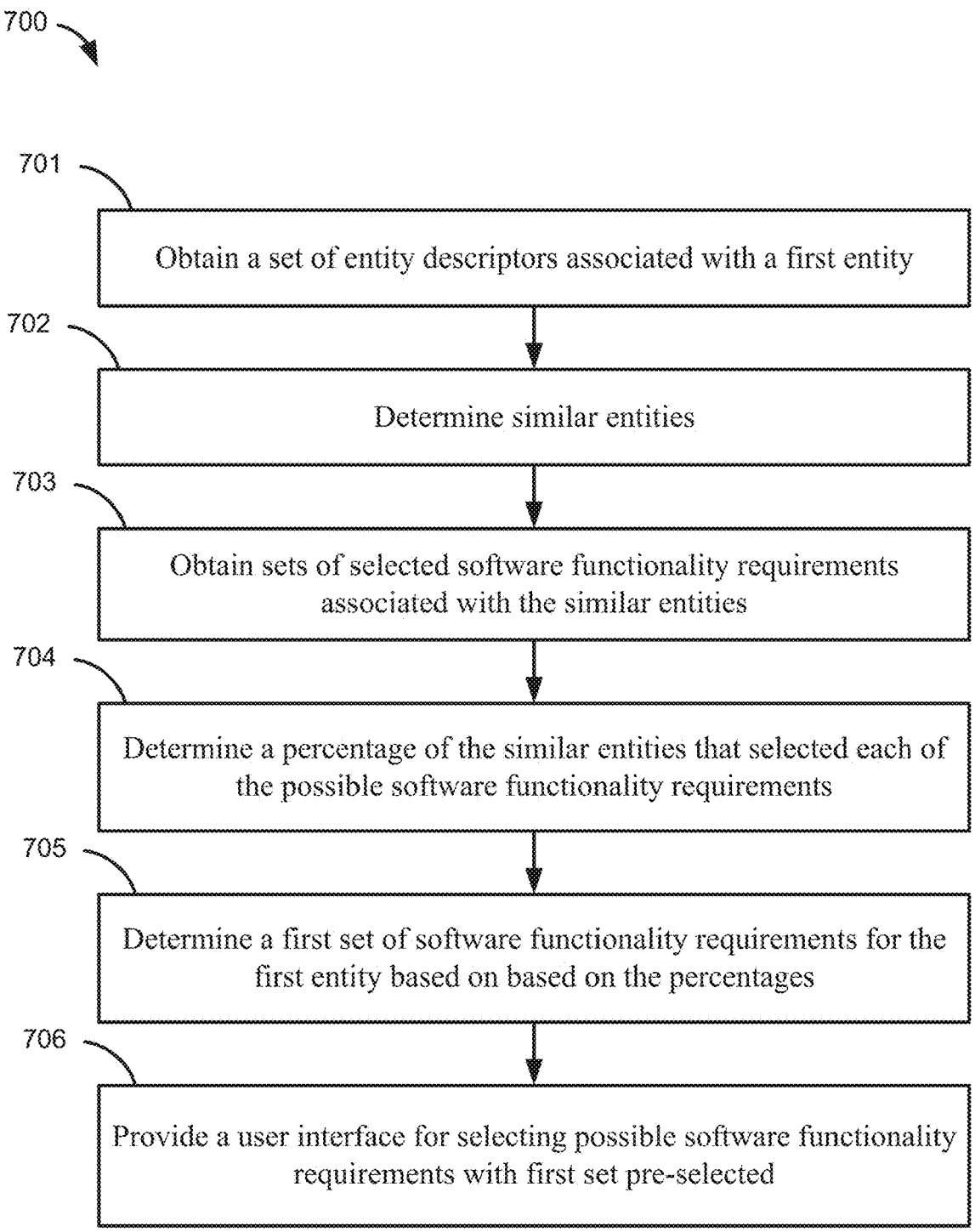
FIG. 7 shows a flow diagram 700 of an exemplary method for automated software setup, according to an embodiment.

FIG. 7 shows a flow diagram 700 of an exemplary computer-implemented method for automated software setup, according to an embodiment. The method may be performed by a computer system performing the setup (e.g., installation) of the software. In some embodiments, the computer system performing the method may be a cloud computing system including computer servers and databases that are remote from a user of the software.

At 701, the computer system obtains a first set of entity descriptors associated with a first entity. The first set of entity descriptors may be obtained from a setup user via a user interface, as discussed above. In some embodiments, the software can be enterprise resource planning software, and the first set of entity descriptors includes one or more of an industry area (e.g., automotive industry) of the first entity, an industry detail (automotive manufacturing) of the first entity, a country (e.g., Germany) of the first entity, and a set of processes (e.g., serial manufacturing, accounting processing, naming conventions, etc.) of the first entity.

At 702, the computer system determines one or more similar entities. The similar entities may be determined by comparing the first set of entity descriptors to each of a plurality of sets of entity descriptors. Each set of entity descriptors may be associated with a particular entity. In some embodiments, the determining of the one or more similar entities is based on determining that the first set of entity descriptors matches sets of entity descriptors for the one or more similar entities. In embodiments may include a determination that the first set of entity descriptors does not match any of the plurality of sets of entity descriptors. In such embodiments, the determining of the one or more similar entities may include accessing a similarity table.

As described herein, the similarity table may indicate a similarity between each different set of entity descriptors. The similarity table may include a similarity value for each pair or combination of entity descriptions. The similarity values in the similarity table may be determined using statistical techniques (e.g., a percentage calculation or using a chi-squared method). The similarity may be used to determine a second set of entity descriptors associated with the one or more similar entities. These similarity values can then be used to determine similar entities if there is no entity that has entity descriptors matching a new entity.

At 703, the computer system obtains sets of selected software functionality requirements associated with each of the one or more similar entities. The sets of selected software functionality requirements may be stored in a functionality requirements table in a software setup database. The one or more similar entities may have already performed the software setup and the software functionality requirements that they selected may be stored for use in pre-selecting requirements for other similar entities having similar entity descriptors, as described herein.

At 704, the computer system determines a percentage of the one or more similar entities that selected each of a plurality of possible software functionality requirements. The percentages may be determined using the set of selected software functionality requirements associated with each of the one or more similar entities.

At 705, the computer system determines a first set of software functionality requirements for the first entity. The first set of software functionality requirement may be determined based on the percentages of the one or more similar entities that selected each of the plurality of possible software functionality requirements. The determination may be made based on a threshold. For example, a certain software functionality requirement may be determined to be in the first set if at least 80% of the similar entities had selected it. In other embodiments the threshold may be higher (e.g., 90%) or it may be lower (e.g., 50%).

At 706, the computer system provides a user interface for selecting the plurality of possible software functionality requirements for the first entity. The first set of software functionality requirements may be pre-selected in the user interface. In one example, the user interface includes check boxes for selecting the software functionality requirements and the first set of software functionality requirements are already checked when the user interface initiates. In this example, the checkboxes for the software functionality requirements that are not in the first set may not be checked upon initiation of the user interface.

In some embodiments, the user interface includes the percentages of the one or more similar entities that selected each of the plurality of possible software functionality requirements. In some embodiments, the percentages may be provided in notifications (e.g., pop-up text bubbles).

In some embodiments, the computer system may store selections of the plurality of possible software functionality requirements for the first entity made via the user interface. The selections may include some or all of the first set of software functionality requirements along with some or none of the other possible software functionality requirements. By storing the software functionality requirements for the new entity, their decisions may be used in the software setup for other entities. Accordingly, in some embodiments the computer system may obtain a second set of entity descriptors associated with a second entity. In this example, the computer system determines that the first entity is similar to the second entity. Then the computer system provides a second user interface for selecting a plurality of possible software functionality requirements for the second entity. In this example, the second user interface includes different percentages that are based on the stored selections of the plurality of possible software functionality requirements for the first entity. This is advantageous because the recommended (e.g., pre-selected) software functionality requirements can adapt over time based on changes in entity processes and environments.

In some embodiments, the computer system can complete the software setup process by configuring the software. For example, the computer system may obtain selections of the plurality of possible software functionality requirements via the user interface. The selections may include the first set of software functionality requirements pre-selected in the user interface. Then the computer system may determine a plurality of configuration settings for the software based on the selections of the plurality of possible software functionality requirements. The configuration settings may be used in execution of the software. In some embodiments, each different set of selected software functionality requirements may be associated with a particular software configuration of the software. As such, the software can be configured and operated according to the different requirements of the various entities.

Example Hardware

Figure 8:
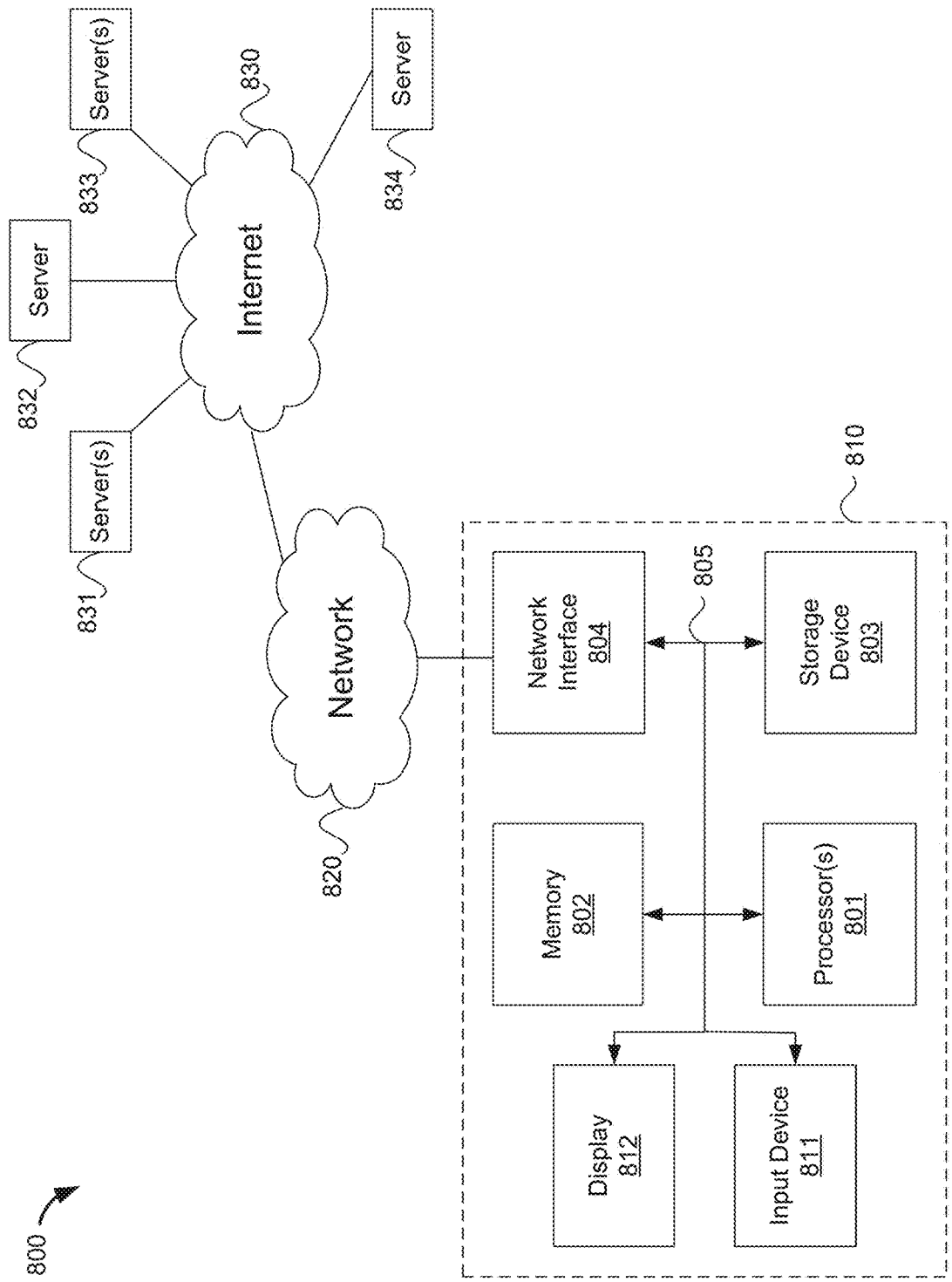
FIG. 8 shows a diagram 800 of hardware of a special purpose computing machine for implementing systems and methods described herein.

FIG. 8 shows a diagram 800 of hardware of a special purpose computing machine for implementing systems and methods described herein.

The following hardware description is merely one example. It is to be understood that a variety of computers topologies may be used to implement the above described techniques. An example computer system 810 is illustrated in FIG. 8. Computer system 810 includes a bus 805 or other communication mechanism for communicating information, and one or more processor(s) 801 coupled with bus 805 for processing information. Computer system 810 also includes a memory 802 coupled to bus 805 for storing information and instructions to be executed by processor 801, including information and instructions for performing some of the techniques described above, for example. This memory may also be used for storing programs executed by processor(s) 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 803 may include source code, binary code, or software files for performing the techniques above, for example. Storage device and memory are both examples of non-transitory computer readable storage mediums.

Computer system 810 may be coupled via bus 805 to a display 812 for displaying information to a computer user. An input device 811 such as a keyboard, touchscreen, and/or mouse is coupled to bus 805 for communicating information and command selections from the user to processor 801. The combination of these components allows the user to communicate with the system. In some systems, bus 805 represents multiple specialized buses, for example.

Computer system 810 also includes a network interface 804 coupled with bus 805. Network interface 804 may provide two-way data communication between computer system 810 and a network 820. The network interface 804 may be a wireless or wired connection, for example. Computer system 810 can send and receive information through the network interface 804 across a local area network, an Intranet, a cellular network, or the Internet, for example. In the Internet example, a browser, for example, may access data and features on backend systems that may reside on multiple different hardware servers 831-834 across the network. The servers 831-834 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method for software setup, comprising:
    obtaining a first set of entity descriptors associated with a first entity;
    comparing the first set of entity descriptors to each of the plurality of sets of entity descriptors, each set of entity descriptors associated with a particular entity, and
    accessing, in response to determining that the first set of entity descriptors does not match any of a plurality of sets of entity descriptors; a similarity table including similarity values and determining one or more sets of entity descriptors associated with one or more similar entities based on the similarity values, the similarity values indicating a similarity between software functionality requirements for entities associated with different sets of entity descriptors;
    obtaining sets of selected software functionality requirements associated with each of the one or more similar entities;
    determining a percentage of the one or more similar entities that selected each of a plurality of possible software functionality requirements using the sets of selected software functionality requirements associated with each of the one or more similar entities;
    determining a first set of software functionality requirements for the first entity based on the percentages of the one or more similar entities that selected each of the plurality of possible software functionality requirements;
    providing a user interface for selecting the plurality of possible software functionality requirements for the first entity, the first set of software functionality requirements being pre-selected in the user interface; and
    providing, in response to hovering of a pointer over a check box in the user interface for a particular software functionality requirement, a notification in the user interface to present the percentage of the one or more similar entities that selected the particular software functionality requirement.

2. The method of claim 1, wherein the user interface includes the percentages of the one or more similar entities that selected each of the plurality of possible software functionality requirements.

3. The method of claim 1, further comprising updating the similarity table based on selections of the plurality of possible software functionality requirements for the first entity made via the user interface.

4. The method of claim 1, further comprising:
    storing selections of the plurality of possible software functionality requirements for the first entity made via the user interface;
    obtaining a second set of entity descriptors associated with a second entity;
    determining that the first entity is similar to the second entity; and
    providing a second user interface for selecting a plurality of possible software functionality requirements for the second entity, the second user interface including second percentages based on the stored selections of the plurality of possible software functionality requirements for the first entity.

5. The method of claim 1, wherein the determining of the one or more similar entities further comprises determining that the first set of entity descriptors matches sets of entity descriptors for the one or more similar entities.

6. The method of claim 1, further comprising:
obtaining selections of the plurality of possible software functionality requirements via the user interface including the first set of software functionality requirements pre-selected in the user interface; and
determining a plurality of configuration settings for the software based on the selections of the plurality of possible software functionality requirements, wherein the configuration settings are used in execution of the software, wherein each different set of selected software functionality requirements is associated with a particular software configuration of the software.

7. The method of claim 1, wherein the software is enterprise resource planning software, and wherein the first set of entity descriptors includes one or more of an industry area of the first entity, an industry detail of the first entity, a country of the first entity, and a set of processes of the first entity.

8. A non-transitory machine-readable medium storing a program executable by at least one processing unit of a device, the program comprising sets of instructions for:
obtaining a first set of entity descriptors associated with a first entity;
comparing the first set of entity descriptors to each of the plurality of sets of entity descriptors, each set of entity descriptors associated with a particular entity, and
accessing, in response to determining that the first set of entity descriptors does not match any of a plurality of sets of entity descriptors; a similarity table including similarity values and determining one or more sets of entity descriptors associated with one or more similar entities based on the similarity values, the similarity values indicating a similarity between software functionality requirements for entities associated with different sets of entity descriptors;
obtaining sets of selected software functionality requirements associated with each of the one or more similar entities;
determining a percentage of the one or more similar entities that selected each of a plurality of possible software functionality requirements using the sets of selected software functionality requirements associated with each of the one or more similar entities;
determining a first set of software functionality requirements for the first entity based on the percentages of the one or more similar entities that selected each of the plurality of possible software functionality requirements;
providing a user interface for selecting the plurality of possible software functionality requirements for the first entity, the first set of software functionality requirements being pre-selected in the user interface; and
providing, in response to hovering of a pointer over a check box in the user interface for a particular software functionality requirement, a notification in the user interface to present the percentage of the one or more similar entities that selected the particular software functionality requirement.

9. The non-transitory machine-readable medium of claim 8, wherein the user interface includes the percentages of the one or more similar entities that selected each of the plurality of possible software functionality requirements.

10. The non-transitory machine-readable medium of claim 8, further comprising instructions for updating the similarity table based on selections of the plurality of possible software functionality requirements for the first entity made via the user interface.

11. The non-transitory machine-readable medium of claim 8, further comprising instructions for:
storing selections of the plurality of possible software functionality requirements for the first entity made via the user interface;
obtaining a second set of entity descriptors associated with a second entity;
determining that the first entity is similar to the second entity; and
providing a second user interface for selecting a plurality of possible software functionality requirements for the second entity, the second user interface including second percentages based on the stored selections of the plurality of possible software functionality requirements for the first entity.

12. The non-transitory machine-readable medium of claim 8, wherein the determining of the one or more similar entities further comprises determining that the first set of entity descriptors matches sets of entity descriptors for the one or more similar entities.

13. The non-transitory machine-readable medium of claim 8, further comprising instructions for:
obtaining selections of the plurality of possible software functionality requirements via the user interface including the first set of software functionality requirements pre-selected in the user interface; and
determining a plurality of configuration settings for the software based on the selections of the plurality of possible software functionality requirements, wherein the configuration settings are used in execution of the software, wherein each different set of selected software functionality requirements is associated with a particular software configuration of the software.

14. The non-transitory machine-readable medium of claim 8, wherein the software is enterprise resource planning software, and wherein the first set of entity descriptors includes one or more of an industry area of the first entity, an industry detail of the first entity, a country of the first entity, and a set of processes of the first entity.

15. A computer system, comprising:
one or more processors;
memory; and
computer program code comprising instructions, executable on said one or more processors, the computer program code configured to:
obtain a first set of entity descriptors associated with a first entity;
compare the first set of entity descriptors to each of the plurality of sets of entity descriptors, each set of entity descriptors associated with a particular entity, and
accessing, in response to determining that the first set of entity descriptors does not match any of a plurality of sets of entity descriptors; a similarity table including similarity values and determining one or more sets of entity descriptors associated with one or more similar entities based on the similarity values, the similarity values indicating a similarity between software functionality requirements for entities associated with different sets of entity descriptors;
obtain sets of selected software functionality requirements associated with each of the one or more similar entities;
determine a percentage of the one or more similar entities that selected each of a plurality of possible software functionality requirements using the sets of selected software functionality requirements associated with each of the one or more similar entities;
determine a first set of software functionality requirements for the first entity based on the percentages of the one or more similar entities that selected each of the plurality of possible software functionality requirements;
provide a user interface for selecting the plurality of possible software functionality requirements for the first entity, the first set of software functionality requirements being pre-selected in the user interface; and
provide, in response to hovering of a pointer over a check box in the user interface for a particular software functionality requirement, a notification in the user interface to present the percentage of the one or more similar entities that selected the particular software functionality requirement.

16. The computer system of claim 15, wherein the computer program code is further configured to:
store selections of the plurality of possible software functionality requirements for the first entity made via the user interface;
update the similarity table based on selections of the plurality of possible software functionality requirements for the first entity made via the user interface;
obtain a second set of entity descriptors associated with a second entity;
determine that the first entity is similar to the second entity; and
provide a second user interface for selecting a plurality of possible software functionality requirements for the second entity, the second user interface including second percentages based on the stored selections of the plurality of possible software functionality requirements for the first entity.

* * * * *